(No Model.) 2 Sheets—Sheet 1.
J. ADMIRE.
CORN PLANTER.
No. 424,447. Patented Apr. 1, 1890.
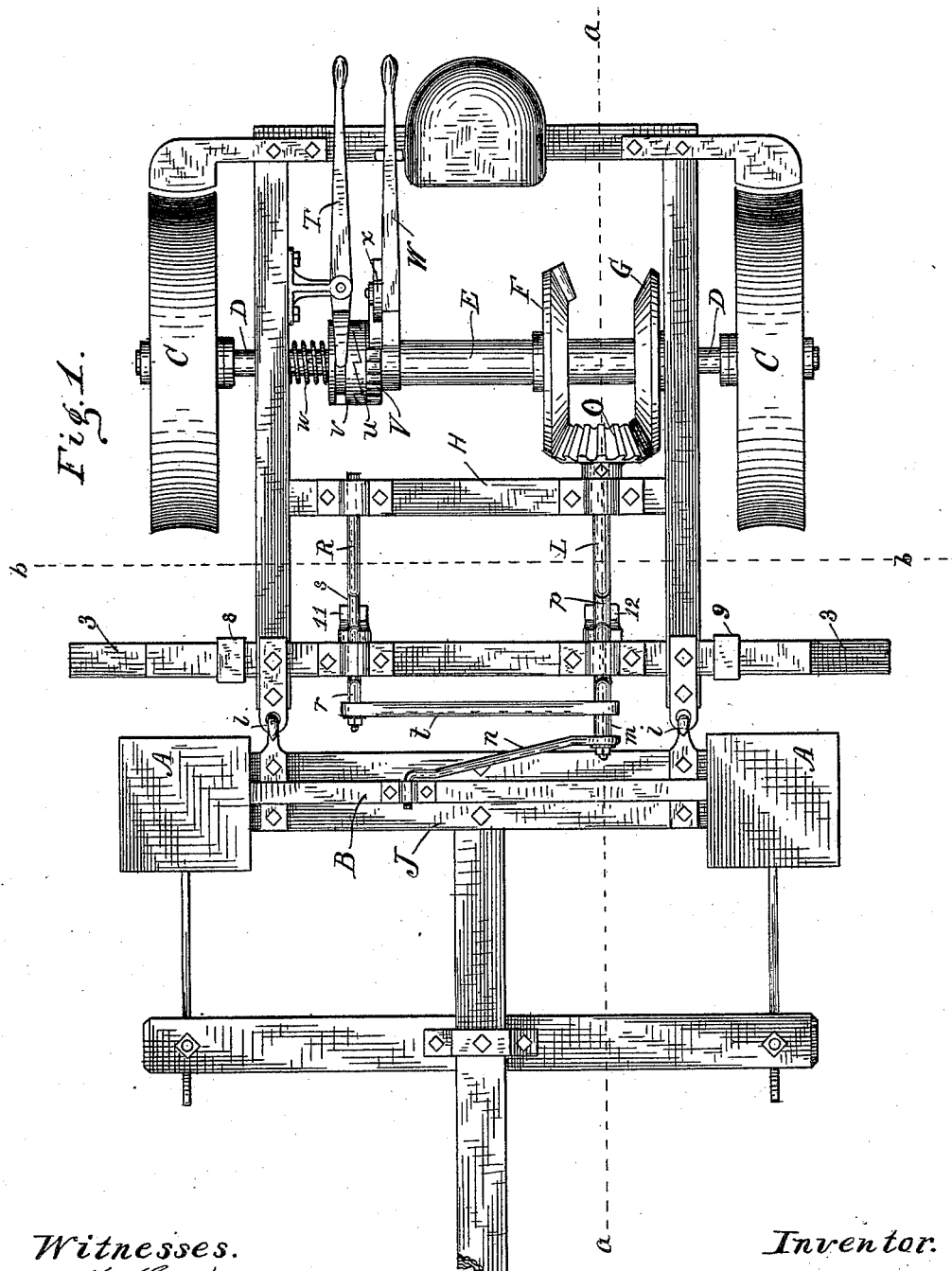
Witnesses.
A. M. Hood.
V. M. Hood.
Inventor.
Joshua Admire,
By
H. P. Hood
Atty.

(No Model.) 2 Sheets—Sheet 2.
J. ADMIRE.
CORN PLANTER.
No. 424,447. Patented Apr. 1, 1890.
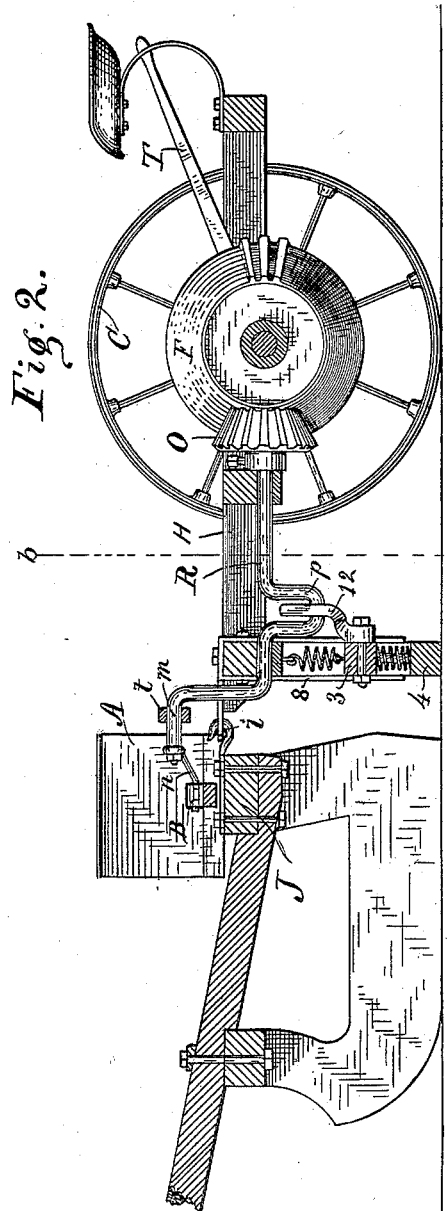
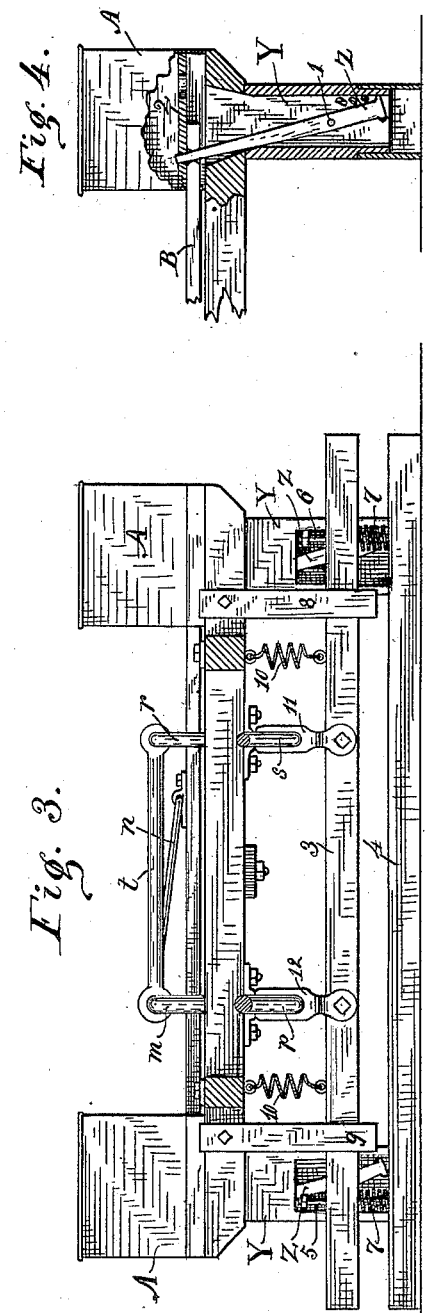
Witnesses.
A. M. Hood.
V. M. Hood.
Inventor.
Joshua Admire
By
H. P. Hood
Atty

UNITED STATES PATENT OFFICE.

JOSHUA ADMIRE, OF SMITH'S VALLEY, INDIANA, ASSIGNOR, BY DIRECT AND MESNE ASSIGNMENTS, TO WILLIAM PRESSER AND LOTAL CARROLL, OF SAME PLACE.

CORN-PLANTER.

SPECIFICATION forming part of Letters Patent No. 424,447, dated April 1, 1890.

Application filed February 11, 1888. Renewed February 1, 1890. Serial No. 338,839. (No model.)

*To all whom it may concern:*

Be it known that I, JOSHUA ADMIRE, a citizen of the United States, residing at Smith's Valley, in the county of Johnson and State of Indiana, have invented a new and useful Corn-Planter, of which the following is a specification.

My invention relates to an improvement in that class of corn-planters which are mounted on a pair of carrying and covering wheels and in which the seed-dropping mechanism is automatically operated by the revolution of the axle on which the wheels are mounted.

The objects of my improvement are, first, to provide means, in connection with the mechanism for operating the dropper, whereby a check-mark shall be made in the earth at each hill, said mark extending from one corn-row to another at right angles to the line of movement of the planter and projecting beyond the rows on each side; and, second, to provide means whereby said marker shall yield to the inequalities of the surface, all as hereinafter fully set forth.

The accompanying drawings illustrate my invention.

Figure 1 is a plan. Fig. 2 is a longitudinal section at *a*, Fig. 1. Fig. 3 is a transverse section at *b*. Fig. 4 represents a vertical section of the seed-box and seed-spout.

A A are seed-boxes having perforated bottoms and seed-dropping mechanisms, which are connected and operated simultaneously by the reciprocating dropping-bar B, in the usual well-known manner.

C C are the carrying-wheels, one of which is rigidly secured to the axle D, so as to turn therewith.

E is a sleeve mounted on axle D, so as to turn easily thereon.

F and G are a pair of mutilated bevel gear-wheels mounted on sleeve E, so as to turn therewith.

H is a wooden frame mounted on axle D and coupled at *i i* to the dropper-frame J.

L is a double-crank shaft mounted in bearings on frame H, having cranks *m* and *p*, and having its crank *m* connected with the dropping-bar B by a pitman *n*.

O is a bevel-pinion secured to shaft L, so as to turn therewith, and arranged between the mutilated gear-wheels F and G, so as to be engaged by each alternately. Crank-shaft L is thus partially rotated alternately in opposite directions by the continuous rotation of sleeve E.

R is a double-crank shaft mounted in bearings on frame H, having cranks *r* and *s*, and having its crank *r* connected with crank *m* of shaft L by a connecting-rod *t*. Sleeve E is connected with axle D, so as to turn therewith by means of a clutch, one part of which *u* is secured to the sleeve, while the other part *v* is mounted on the axle, so as to slide along and turn with the axle. The two parts of the clutch are held normally in engagement by the spring *w* and are disconnected by means of the lever T. For the purpose of enabling the operator to turn sleeve E independently of axle D, a ratchet-wheel V is secured to the sleeve, and a lever W, having a pawl *x*, which engages the ratchet-wheel, is fulcrumed on the sleeve.

Y is the seed-spout into which the seed falls when dropped from box A.

Z is a valve pivoted in the seed-spout at 1 and connected at the top with the dropping-bar B, the arrangement being such that the seed, falling from the seed-box through the dropping-plate 2, is retained alternately on each side of the lower end of the valve near the lower end of the spout and is delivered at the next movement of the dropping-bar, the purpose being to insure the delivery of the seed as nearly as possible at the instant the dropping-bar moves.

For the purpose of causing the under surface of the marking-bar to yield to inequalities of the surface it is constructed as follows: The marking-bar consists of two narrow bars 3 and 4, connected by bolts 5 and 6, which are secured in bar 4 and slide easily through bar 3. Said bars are of sufficient length to extend across and project beyond the seed-spouts on each side of the planter. They are normally held apart by spiral springs 7 7, and the whole device is suspended from the under side of frame H, between the vertical guides 8 and 9, by springs 10.

The dropping-bar is connected by short connecting-rods 11 and 12 with the cranks $p$ and $s$ of the shafts L and R.

The operation of my machine is as follows: Parts $u$ and $v$ of the clutch being in engagement, sleeve E and gear-wheels F and G revolve with the axle D as the machine moves forward. Pinion O is engaged alternately on opposite sides by the teeth of wheels F and G, and an oscillating movement is thus imparted to shafts L and R and a reciprocating movement to the dropping-bar B. At each backward and forward movement of bar B the seed-dropping mechanism of the seed-boxes (which mechanism may be of any well-known form) is operated. The seed first dropped into the seed-spouts Y is retained by the valves Z until the next stroke of the dropping-bar, when it is delivered at the bottom of the spout to the furrow. At each oscillation of shafts L and R the marking-bars 3 and 4 are forced downward by the cranks $p$ and $s$ and raised by the springs 10, thus making in the soft earth a mark which serves to indicate the point where the seed has been dropped. In starting the next time across the field the sleeve E is disconnected from the shaft by means of lever T. The machine is now moved forward until the marking-bar is opposite the first mark in the row previously planted. The operator now turns sleeve E on the axle by means of lever W and ratchet-wheel V until the dropping-bar is once thrown. Clutch $v$ is then engaged and the dropper is actuated automatically, as before.

I claim as my invention—

1. In a corn-planter, the combination, with the main frame, the dropping-bar, and the mechanism for reciprocating the same, of the marking-bar, consisting of the bars 3 and 4, having an elastic yielding connection between them suspended beneath the frame transversely to the line of draft and connected to the mechanism for reciprocating the dropping-bar, whereby the marking-bar is raised and lowered at each movement of the dropping-bar and is adapted to yield to inequalities of the surface, substantially as and for the purpose specified.

2. In a corn-planter, the combination of the main frame H, guides 8 and 9, bars 3 and 4, bolts 5 and 6, springs 7 7, springs 10, crank-shafts L and R, having cranks $p$ and $s$, connecting-rod $t$, connecting-rods 11 and 12, pinion O, gear-wheels F and G, sleeve E, shaft D, and wheels C C, all arranged to co-operate substantially as and for the purpose specified.

JOSHUA ADMIRE.

Witnesses:
WILLIAM PRESSER,
H. P. HOOD.